United States Patent
Robichaux et al.

(10) Patent No.: US 6,425,373 B1
(45) Date of Patent: Jul. 30, 2002

(54) SYSTEM AND METHOD FOR DETERMINING ENGINE CONTROL PARAMETERS BASED ON ENGINE TORQUE

(75) Inventors: Jerry Dean Robichaux, Riverview; Gopichandra Sumilla, Westland; Tobias John Pallett, Ypsilanti, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/366,936

(22) Filed: Aug. 4, 1999

(51) Int. Cl.⁷ ............................................. F02D 41/00
(52) U.S. Cl. .................. 123/436; 123/406.23; 123/350; 701/103
(58) Field of Search .......................... 123/436, 406.23, 123/339.17, 339.18, 349, 350, 352; 701/103, 104, 105, 108, 110

(56) References Cited

U.S. PATENT DOCUMENTS

| 4,353,272 A | 10/1982 | Schneider et al. |
| 4,697,561 A | 10/1987 | Citron |
| 4,730,708 A | 3/1988 | Hamano et al. |
| 4,739,483 A | 4/1988 | Ina et al. |

(List continued on next page.)

FOREIGN PATENT DOCUMENTS

| AU | B 66831/81 | 9/1982 |
| EP | 0 206 091 B1 | 12/1986 |
| EP | 0 340 764 | 11/1989 |
| EP | 0 408 767 B1 | 1/1991 |
| EP | 0 413 031 B1 | 2/1991 |
| EP | 0 557 299 B1 | 10/1991 |
| EP | 0 749 524 B1 | 2/1995 |
| EP | 0 754 888 A2 | 1/1997 |
| GB | 2 154 763 A | 9/1985 |
| GB | 2 239 500 B | 7/1991 |
| GB | 2 239 683 A | 7/1991 |
| GB | 2 239 683 B | 7/1991 |
| GB | 2 312 970 A | 11/1997 |
| WO | WO 95/01502 | 1/1995 |

OTHER PUBLICATIONS

"Hierarchial Control Strategy of Powertrain Functions", by H.M. Streib et al, 24. FISITA Congress, London Jun. 7–11, 1992, pp. 1–11.

"Torque–Based System Structure of the Electronic Engine Management System (ME7) as a New Base for Drive Train Systems", by J. Gerhardt et al, 6. Aachener Kolloquim Fahrzeug—und Motorentechnik '97, Oct. 22, 1997, pp. 817–849.

Primary Examiner—Willis R. Wolfe
Assistant Examiner—Arnold Castro
(74) Attorney, Agent, or Firm—Allan J. Lippa (57) ABSTRACT

A system and method for determining control parameters for an engine include modifying a first engine torque based on estimated losses associated with a previously determined desired engine load to determine a second engine torque, modifying the second engine torque based on a desired ignition angle and air/fuel ratio to determine a third engine torque, determining a desired engine load based on the third engine torque, and converting the desired engine load to at least one engine control parameter. The invention recognizes that the transformation between torque and airflow is an affine transformation rather than a linear transformation. The present invention also recognizes the significant interrelations between various engine control parameters such as air/fuel ratio and ignition timing by determining control parameters after the desired torque has been fully compensated for losses and using a single function to account for air/fuel ratio and ignition angle excursions. In addition, the present invention accounts for the reduction in secondary pumping effects which may reduce pumping losses in some applications.

26 Claims, 4 Drawing Sheets

U.S. PATENT DOCUMENTS

| | | | |
|---|---|---|---|
| 4,819,596 A | 4/1989 | Yasuoka et al. | |
| 4,951,627 A | 8/1990 | Watanabe et al. | |
| 5,069,181 A | 12/1991 | Togai et al. | |
| 5,078,109 A | 1/1992 | Yoshida et al. | |
| 5,086,668 A | 2/1992 | Fujiwara et al. | |
| 5,109,732 A | 5/1992 | Takizawa | |
| 5,241,855 A * | 9/1993 | Cullen et al. | 73/117.3 |
| 5,245,966 A | 9/1993 | Zhang et al. | |
| 5,304,102 A | 4/1994 | Narita et al. | |
| 5,325,740 A | 7/1994 | Zhang et al. | |
| 5,351,776 A | 10/1994 | Keller et al. | |
| 5,374,224 A | 12/1994 | Huffmaster et al. | |
| 5,398,544 A | 3/1995 | Lipinski et al. | |
| 5,407,401 A | 4/1995 | Bullmer et al. | |
| 5,408,966 A | 4/1995 | Lipinski et al. | |
| 5,408,974 A | 4/1995 | Lipinski et al. | |
| 5,431,139 A | 7/1995 | Grutter et al. | |
| 5,437,253 A | 8/1995 | Huffmaster et al. | |
| 5,445,125 A | 8/1995 | Allen | |
| 5,462,501 A | 10/1995 | Bullmer et al. | |
| 5,479,898 A * | 1/1996 | Cullen et al. | 123/350 |
| 5,484,351 A | 1/1996 | Zhang et al. | |
| 5,501,644 A | 3/1996 | Zhang | |
| 5,503,129 A | 4/1996 | Robichaux et al. | |
| 5,520,159 A | 5/1996 | Pao et al. | |
| 5,568,795 A | 10/1996 | Robichaux et al. | |
| 5,575,257 A | 11/1996 | Lange et al. | |
| 5,588,178 A | 12/1996 | Liu | |
| 5,603,672 A | 2/1997 | Zhang | |
| 5,605,131 A | 2/1997 | Ohno et al. | |
| 5,606,951 A | 3/1997 | Southern et al. | |
| 5,628,706 A | 5/1997 | Zhang et al. | |
| 5,680,763 A | 10/1997 | Unland et al. | |
| 5,692,471 A | 12/1997 | Zhang | |
| 5,743,083 A | 4/1998 | Schnaibel et al. | |
| 5,939,846 A * | 8/1999 | Young et al. | 318/98 |
| 6,000,376 A * | 12/1999 | Hess et al. | 123/333 |
| 6,119,063 A * | 9/2000 | Hieb et al. | 701/110 |

* cited by examiner

SYSTEM AND METHOD FOR DETERMINING ENGINE CONTROL PARAMETERS BASED ON ENGINE TORQUE

TECHNICAL FIELD

The present invention is directed to a system and method for determining engine control parameters such as airflow and/or fuel flow based on engine torque.

BACKGROUND ART

Electronic airflow control systems, such as variable cam timing systems and electronic throttle control systems, replace traditional mechanical throttle cable systems with an "electronic linkage" provided by sensors and actuators in communication with an electronic controller. This increases the control authority of the electronic controller and allows the airflow and/or fuel flow to be controlled independently of the accelerator pedal position.

To control the actual output engine brake torque to achieve the driver demanded engine brake torque, it is necessary to determine appropriate values for corresponding engine control parameters, such as airflow and fuel flow. Preferably, this computation accounts for variations in engine operating parameters, such as engine operating temperature and accessory losses.

Prior art approaches convert the desired engine torque to a desired airflow using a two-dimensional lookup table with inputs for desired torque and engine speed. However, such lookup tables are typically calibrated for stoichiometric operation and for maximum brake torque (MBT). The resulting desired airflow is then modified to account for engine operating temperature and air/fuel ratio to generate a modified or corrected airflow. The corrected desired airflow is then achieved via an appropriate airflow rate controller. This approach may be seen by reference to U.S. Pat. Nos. 5,351,776, 5,383,432 and 5,501,989, for example.

While the prior art approaches may be acceptable for many applications and operating conditions, it is desirable to provide a more robust engine torque controller which improves powertrain performance for current applications and is more amenable to new engine technologies and control strategies such as direct injection, lean burn, variable cam timing, and variable displacement applications.

SUMMARY OF THE INVENTION

It is an object of the present invention to provide a system and method for determining at least one engine control parameter based on a requested engine brake torque which has been compensated or modified to account for current engine operating parameters and/or control modes.

Another object of the present invention is to provide a system and method for engine torque control capable of simultaneously determining a desired airflow and fuel flow to produce a desired engine torque that accounts for engine operating parameters.

In carrying out the above object and other objects, advantages, and features of the present invention, a system and method for determining control parameters for an engine include modifying a first engine torque based on estimated losses associated with a previously determined desired engine load to determine a second engine torque, modifying the second engine torque based on a desired ignition angle and air/fuel ratio to determine a third engine torque, determining a desired engine load based on the third engine torque, and converting the desired engine load to at least one engine control parameter.

The present invention provides a number of advantages over prior art control strategies. The present invention recognizes that the transformation between torque and airflow is an affine transformation rather than a linear transformation. While this distinction may result in imperceptible changes in operation for combustion at or near the stoichiometric ratio, it becomes problematic for various applications including lean burn strategies where air/fuel ratios are far from stoichiometry (around 18:1).

The present invention also recognizes the significant interrelations between various engine control parameters such as air/fuel ratio and ignition timing by determining control parameters after the desired torque has been fully compensated for losses. In addition, the present invention accounts for the reduction in secondary pumping effects which may reduce pumping losses as much as 50% during lean operation or variable cam timing operation. In one embodiment, the present invention provides improved torque control during transient conditions, such as during a gear shift or during changes in operator demand, by determining fuel flow and airflow simultaneously based on the desired torque rather than determining fuel flow as a result of actual airflow.

The above advantages and other advantages, objects, and features of the present invention, will be readily apparent from the following detailed description of the best mode for carrying out the invention when taken in connection with the accompanying drawings.

BEST MODES FOR CARRYING OUT THE INVENTION

Figure 1:
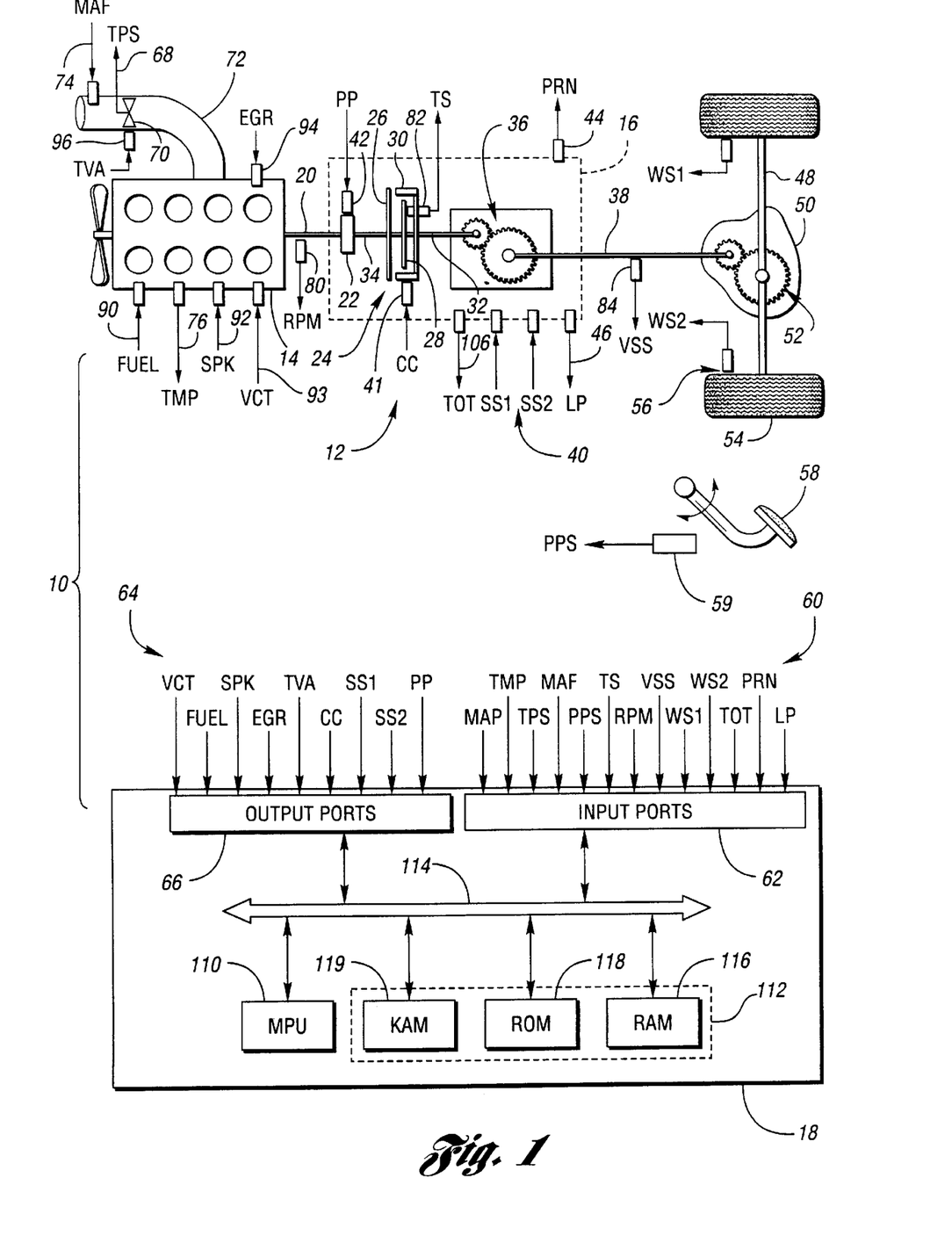
FIG. 1 is a block diagram illustrating a system and method for determining engine control parameters based on requested engine torque according to the present invention.

FIG. 1 is a block diagram illustrating a system and method for determining engine control parameters based on requested engine torque according to the present invention.

System 10 includes a vehicular powertrain 12 having an internal combustion engine 14 coupled to an automatic transmission 16. Of course, the present invention is equally applicable to manual transmission applications. Powertrain 12 may also include a controller 18 in communication with engine 14 and transmission 16 for providing various information and control functions. Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34.

Automatic transmission 16 includes a plurality of input-to-output ratios or gear ratios effected by various gears, indicated generally by reference numeral 36, and associated frictional elements such as clutches, bands, and the like, as well known in the art. Gears 36 provide selective reduction or multiplication ratios between turbine shaft 32 and output shaft 38. Automatic transmission 16 is preferably electronically controlled via one or more shift solenoids, indicated generally by reference numeral 40, and a converter clutch control (CC) 41 to select an appropriate gear ratio based on current operating conditions. Transmission 16 also preferably includes an actuator for controlling pump pressure (PP) 42 (or line pressure), in addition to a shift lever position sensor (PRN) 44 to provide an indication of the operator's selected gear or driving mode, such as drive, reverse, park, etc. A line pressure sensor (LP) 46 can be provided to facilitate closed loop feedback control of the hydraulic line pressure during shifting or ratio changing.

Depending upon the particular application, output shaft 38 may be coupled to one or more axles 48 via a final drive reduction or differential 50 which may include one or more gears, as indicated generally by reference numeral 52. Each axle 48 may include two or more wheels 54 having corresponding wheel speed sensors 56.

In addition to the sensors described above, powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 66 to effect control of powertrain 12 in response to commands generated by controller 18.

The sensors preferably include a throttle valve position sensor (TPS) 68 which monitors the position of throttle valve 70 which is disposed within intake 72. A mass airflow sensor (MAF) 74 provides an indication of the air mass flowing through intake 72. A temperature sensor (TMP) 76 provides an indication of the engine temperature which may include engine coolant temperature or engine oil temperature, for example.

As also illustrated in FIG. 1, an engine speed sensor (RPM) 80 monitors rotational speed of crankshaft 20. Similarly, a turbine speed sensor 82 monitors the rotational speed of the turbine 28 of torque converter 24. Another rotational speed sensor, vehicle speed sensor (VSS) 84, provides an indication of the speed of output shaft 38 which may be used to determine the vehicle speed based on the ratio of differential 50 and the size of wheels 54. Of course, wheel speed sensors (WS1 and WS2) 56 may be used to provide an indication of the vehicle speed as well.

Depending upon the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is manipulated by the driver to control the output of powertrain 12. A pedal position sensor 59 provides an indication of the position of accelerator pedal 58, preferably in the form of counts. In one embodiment, an increasing number of counts indicates a request for increased power output. Preferably, redundant position sensors are used with at least one position sensor having a negative slope such that a decreasing number of counts corresponds to a request for increased power output. A manifold absolute pressure (MAP) sensor, or equivalent, may be used to provide an indication of the current barometric pressure.

Actuators 64 are used to provide control signals or to effect movement of various devices in powertrain 12. Actuators 64 may include actuators for timing and metering fuel (FUEL) 90, controlling ignition angle or timing (SPK) 92, controlling intake/exhaust valve actuators 93 (VCT) to implement variable cam timing, setting the amount of exhaust gas recirculation (EGR) 94, and adjusting the intake air using throttle valve 70 with an appropriate servomotor or actuator (TVA) 96. As described above, automatic transmission 16 may be selectively controlled by controlling transmission pump or line pressure using an appropriate actuator (PP) 42 in combination with shift solenoids (SS1 and SS2) 40 which are used to select an appropriate gear ratio, and a converter clutch actuator or solenoid (CC) 41 used to lock, unlock or control slip of the torque converter clutch 30. Also preferably, a temperature sensor 106 is provided to determine the transmission oil temperature (TOT).

Controller 18 is preferably a microprocessor-based controller which provides integrated control of engine 14 and transmission 16 of powertrain 12. Of course, the present invention may be implemented using separate engine and transmission controllers depending upon the particular application. Controller 18 includes a microprocessor 110 in communication with input ports 62, output ports 66, and computer readable media 112 via a data/control bus 114. Computer readable media 112 may include various types of volatile and nonvolatile memory such as random access memory (RAM) 116, read-only memory (ROM) 118, and keep-alive memory (KAM) 119. These "functional" descriptions of the various types of volatile and nonvolatile storage may be implemented by any of a number of known physical devices including but not limited to EPROMs, EEPROMs, PROMs, flash memory, and the like. Computer readable media 112 include stored data representing instructions executable by microprocessor 110 to implement the method for controlling engine torque according to the present invention.

Figure 2:
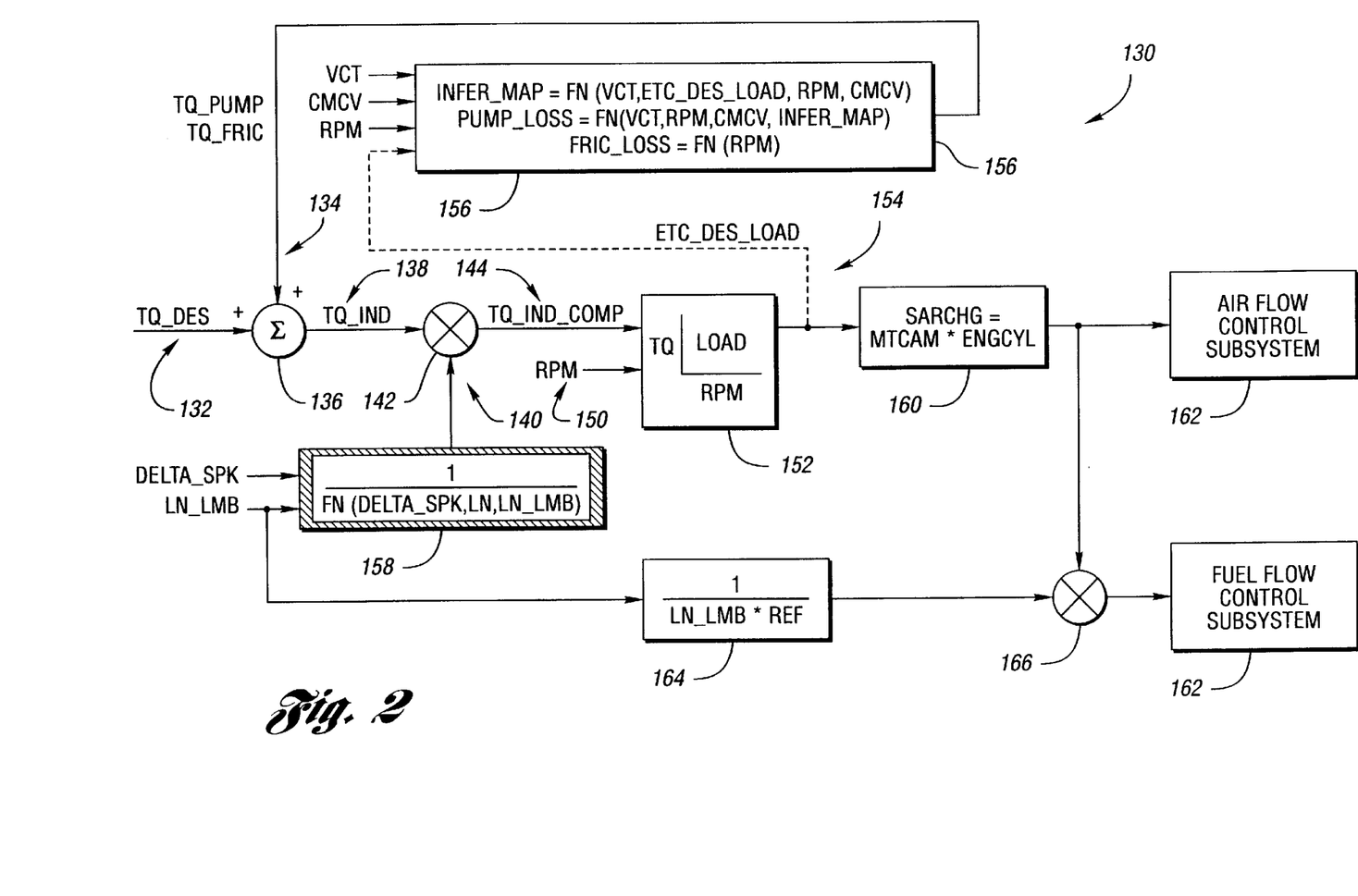
FIG. 2 is a block diagram illustrating an engine brake torque controller according to the present invention.

FIG. 2 is a block diagram illustrating an engine brake torque controller according to the present invention. Engine brake torque controller 130 is preferably integrated into an engine control strategy as described in detail in U.S. patent application Ser. No. 09/370,234, entitled "System And Method For Controlling Engine Torque", filed Aug. 9, 1999, and assigned to the assignee of the present invention, the disclosure of which is hereby incorporated by reference in its entirety. As described in that application, a desired engine brake torque is determined based at least in part on accelerator pedal position. The desired engine brake torque is adjusted or modified based on current engine operating conditions to produce a requested engine brake torque prior to determination of engine control parameters to effect the requested brake torque. As illustrated in FIG. 2, the present invention provides an improved engine brake torque controller which determines the values for various engine control parameters to effect the requested engine brake torque.

A requested engine brake torque (TQ_DES) is provided as represented generally by reference numeral 132. The requested engine brake torque preferably has been previously adjusted to incorporate various losses including cold engine frictional losses, accessory loads, and the like. A value representing additional engine losses, represented generally by reference numeral 134, is combined with the requested engine torque at summing junction 136 to generate a desired engine indicated or combustion torque 138 (TQ_IND). Preferably, engine losses 134 provide feedback based on a previously determined desired engine load (ETC_DES_LOAD) as explained in greater detail below.

The engine combustion torque is modified based on a desired value of at least one operating parameter. In this embodiment, a value 140 is determined based on a function of ignition angle 146 (DELTA_SPK) and air/fuel ratio 148 (LN_LMB) as represented by block 158 and is used to modify the indicated torque at block 142 to produce a modified combustion (or indicated) torque (TQ_IND_COMP) represented by reference numeral 144. Preferably, the ignition angle (DELTA_SPK) is a relative offset (advance or retard) from the ignition angle determined to produce maximum brake torque (MBT). Likewise, the air/fuel ratio (LN_LMB)is preferably a ratio of the desired air fuel ratio to a stoichiometric reference ratio. For example, to compensate for a reduction in indicated torque due to spark retard from MBT, the controller would divide the original indicated torque request (TQ_IND) by a "torque ratio" factor that accounts for the reduction due to spark retard.

The modified combustion torque 144 is used along with current engine speed (RPM) 150 to access a lookup table 152 which determines a desired load 154 (ETC_DES_LOAD), preferably in the form of a desired air mass which is a percentage of the maximum theoretical cylinder air mass (MTCAM). The lookup table contains calibrations for the required load to produce the requested indicated torque (TQ_IND), assuming the engine is operating with the air/fuel ratio at stoichiometry, and spark at MBT settings. Any deviations from stoichiometry or MBT are preferably compensated for by dividing the indicated torque input to this table by a torque ratio factor. The output of this table (ETC_DES_LOAD) is provided as feedback to block 156 which determines the additional engine losses.

In one embodiment, block 156 includes a lookup table to determine engine pumping losses (TQ_PUMP) and warm engine frictional losses (TQ_FRIC) as described in U.S. Pat. No. 5,241,855. Preferably, a table (BASE_FRIC_TQ) having inputs of engine speed and air charge (or load) returns a value representing the friction and pumping torque losses for a warmed-up engine. However, the single table approach is difficult to extend for the effects of variable cam timing (VCT) and secondary throttle (CMCV) sometimes referred to as an intake manifold runner control (IMRC) valve. Preferably, the pumping losses are determined by using the desired load 154 (ETC_DES_LOAD) and estimating the operating manifold pressure of the system (INFER_MAP), given the CMCV and VCT settings. A table of engine speed and INFER_MAP or alternatively a polynomial regression is used to infer the pumping losses. If a table is preferred, then multiple tables would be needed to represent the effects of the multiple CMCV positions. The polynomial could take the form:

$$TQ\_PUMP = F_1 + F_2 * RPM + F_3 * INFER\_MAP + F_4 * RPM * INFER\_MAP + F_5 * RPM^2 * INFER\_MAP$$

where $F_1$ through $F_5$ may be a function of the CMCV position being either fully open, fully closed, or partially open. For some applications, engine pumping losses are substantially reduced during certain modes of operation. If this factor is not considered, these operation modes result in generation of more combustion torque than required to achieve the requested engine brake torque. The warm engine frictional losses are determined as a function of engine speed (RPM). The combined or net torque adjustment is then used to modify or adjust the requested engine brake torque at block 136.

The desired engine load or air mass is converted to a desired airflow (ETC_MAF) by multiplying the maximum theoretical cylinder air mass by the number of engine cylinders intaking air per engine revolution and by the engine speed or RPM. The desired airflow is then provided to the airflow control subsystem as represented by block 162.

In one embodiment, the desired airflow is also used to determine the desired fuel mass and corresponding fuel flow. In this embodiment, the required airflow is multiplied at block 166 by the reciprocal of the desired air/fuel ratio represented by block 164. This value is then provided to the fuel flow control subsystem as represented by block 168. Determination of the desired fuel flow based on the desired airflow rather than the actual airflow provides improved transient torque control particularly in lean burn applications where the air/fuel ratios are such that a change in airflow has reduced effect on combustion torque as compared to the same change for stoichiometric operation.

Figure 3:
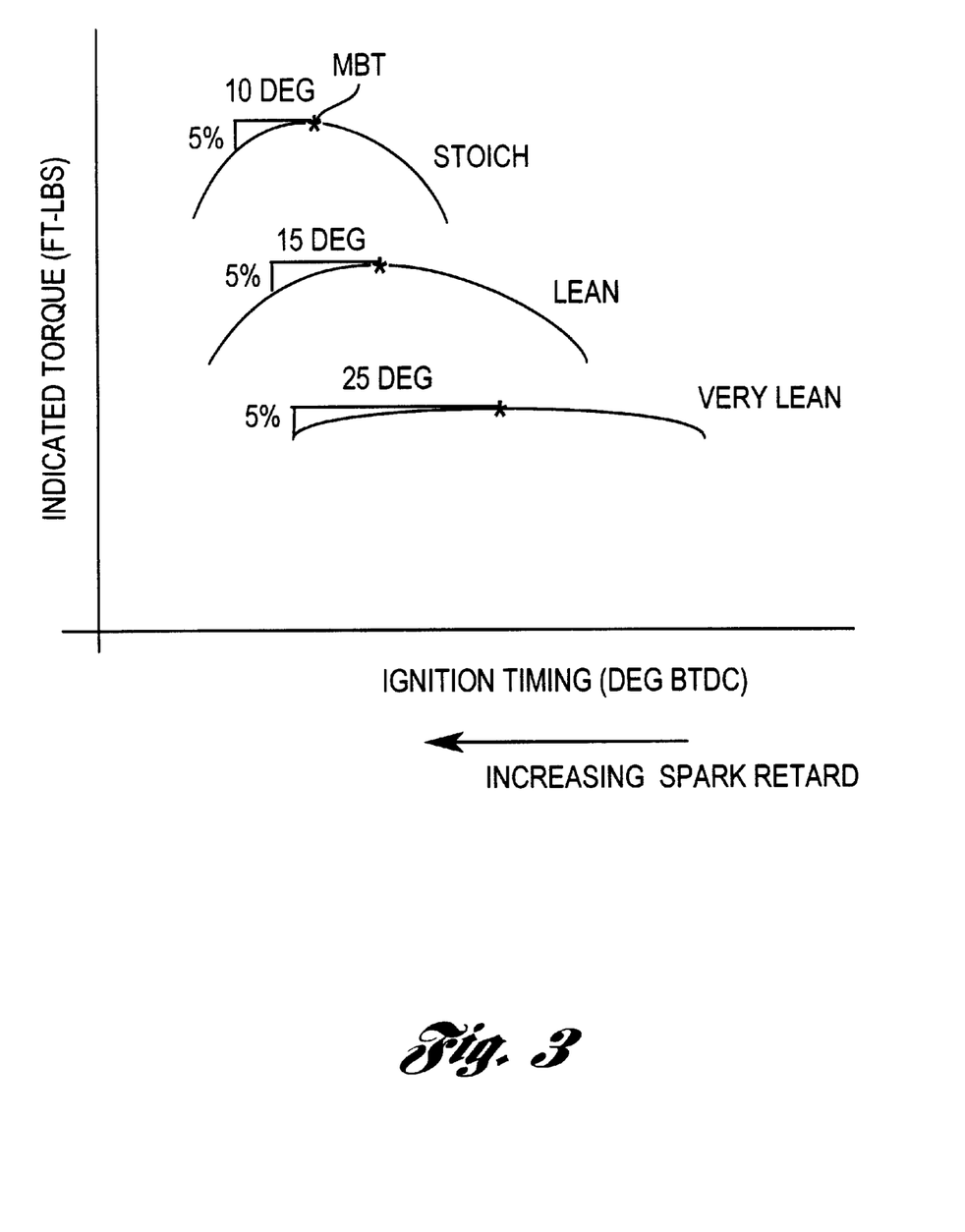
FIG. 3 is a representative function used to modify engine torque based on ignition angle and air/fuel ratio.

FIG. 3 provides a representative graph illustrating the effect of spark timing and air/fuel ratio on the indicated (combustion) torque for three representative air/fuel ratio settings corresponding to stoichiometry, lean, and very lean operating conditions. For leaner mixtures, the sensitivity of indicated torque to changes in spark retard is gradually reduced. This results because lean air/fuel mixtures slow down the burn rate of the fuel, thus making indicated torque less sensitive to small changes in spark timing. If a 5% reduction in indicated torque is desired, for example, then the air/fuel setting must be considered before determining the required retard in spark timing, i.e., 10 degrees for a ratio of about 14.6:1, 15 degrees for a ratio of about 18:1, and 25 degrees for a ratio of about 25:1. Conversely, if compensating for an existing spark retard is desired, the air/fuel setting must be considered before assessing the percent reduction in indicated torque. As disclosed in U.S. Pat. No. 5,241,855, the change in indicated torque can be approximated as the product of two independent functions: one a function of lambse (ITQAFMUL) and the other a function of spark retard from MBT (ITQSPKMUL).

As the operating air/fuel ratio approaches and begins to exceed 18:1, the above approximation does not adequately represent the inter-relation of spark retard for lean air/fuel settings. Preferably, a single function is utilized to capture the inter-relationships between these two control variables. In one embodiment, this function is stored in a lookup table which is referenced by an air/fuel ratio and ignition angle with the output being a torque adjustment in the form of a total torque ratio. Preferably, the air/fuel ratio used to access the lookup table is a measure of the desired air/fuel ratio relative to a reference value which is preferably the stoichiometric air/fuel ratio for the particular application. In one embodiment, a variable representing the ratio of desired air/fuel ratio to the stoichiometric air/fuel ratio (typically 14.7:1) is used to access the lookup table along with a value representing the ignition angle as a relative spark retard from the maximum brake torque (MBT) ignition angle.

Other factors that may slow down the burn rate include high exhaust gas recirculation (EGR) values, and the air/fuel mixture compression which is affected by the amount of cylinder air charge or load. Thus, the single lookup table may require augmentation for high EGR and/or low load operation depending upon the particular application.

Figure 4:
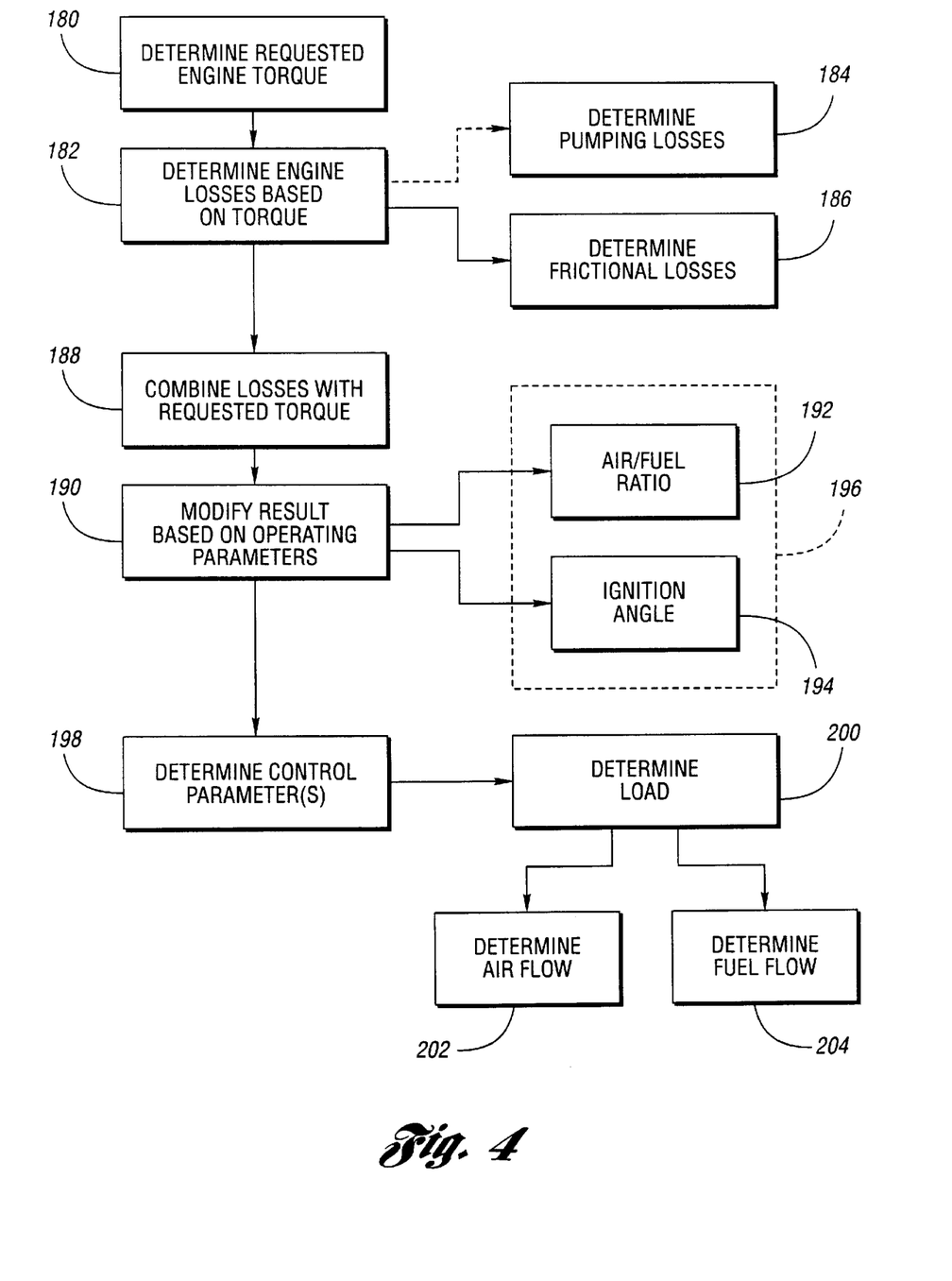
FIG. 4 is a flowchart illustrating operation of a system or method for determining engine control parameters based on requested engine torque according to the present invention.

Referring now to FIG. 4, a flowchart illustrating control logic of one embodiment of a system or method according to the present invention is shown. As will be appreciated by one of ordinary skill in the art, the flowchart illustrated in FIG. 4 may represent any of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Preferably, the control logic is implemented in software which is executed by a microprocessor-based controller. Of course, the control logic may be implemented in software, hardware, or a combination of software and hardware. The flowchart of FIG. 4 illustrates one "loop" and its operations are preferably repeated at predetermined time intervals as known by those of skill in the art.

The requested (first) engine torque is determined as represented by block 180. Preferably, the requested engine torque represents a requested engine brake torque which has been compensated relative to a driver demanded engine brake torque for various accessory torques and losses. Accessory torques may include the torque required to operate an air conditioning compressor or power steering pump, for example. The requested engine torque is also preferably compensated to achieve a smooth transition between various engine operating modes using feedback control and/or an idle speed control trim value as described in greater detail in the related U.S. patent application identified above. The present invention operates independently of the particular method or strategy used to determine the requested engine torque and may be used with a number of different strategies and engine technologies.

Block 182 of FIG. 4 represents determination of a value representing engine losses (a second torque) based at least in part on the requested engine torque. Preferably, this step incorporates feedback from a previously determined value for the desired engine load as described in greater detail below. This step may include determination of engine pumping losses, as represented by block 184, and rotational friction losses, as represented by block 186, based on warm engine operation. Warm engine frictional losses are preferably based on engine speed (RPM) rather than temperature because the temperature related frictional losses are preferably accounted for in the determination of the requested engine brake torque. Preferably, pumping losses are determined based on variable cam timing angles, secondary throttle opening (if present), engine speed, and an inferred manifold absolute pressure (INFER_MAP). For electronic airflow control applications, a significant reduction (up to 50%) in pumping losses may occur during various operating modes which is accounted for in the determination represented by block 182.

The value representing the engine losses is then combined with the requested engine torque as represented by block 188 to determine a desired engine combustion torque (a second torque). This result is then modified based on at least one engine operating parameter as represented by block 190. In one embodiment, the engine operating parameters include a first variable representing a desired air/fuel ratio as represented by block 192 and a second variable representing a desired ignition angle as represented by block 194. Preferably, block 190 includes modifying the combustion torque based on a single function of ignition angle and air/fuel ratio as represented generally by block 196. The use of a single function captures the inter-relationships between ignition angle and air/fuel ratio on the torque produced by the engine as opposed to the prior art practice of having separate functions or lookup tables to separately compensate for each control parameter.

In one preferred embodiment, the variable representing the air/fuel ratio of block 192 is a ratio of a desired air/fuel ratio to a reference air/fuel ratio which is preferably the stoichiometric air/fuel ratio for the particular application. Likewise, the variable representing the ignition angle of block 194 is a relative ignition angle which represents the deviation from an ignition angle required to produce maximum brake torque (MBT).

At least one engine control parameter is then determined based on the modified combustion torque as represented by block 198 of FIG. 4. In one embodiment, block 198 includes determination of a desired load, preferably based on the modified combustion torque and the current engine speed as represented by block 200. The desired load is then used to determine a desired air mass and corresponding airflow as represented by block 202. Depending upon the particular application, the desired load may be used to determine a desired air mass which is used to determine a desired fuel mass and corresponding fuel flow as represented by block 204. Preferably, fuel flow is determined based on the desired air mass or airflow rather than the actual air mass or air flow to improve transient control as actual air mass response times reduce the responsiveness of the control. In a preferred embodiment, the desired airflow is determined using a lookup table to determine the desired air mass which is then converted to a desired airflow. The desired airflow and/or fuel flow is then effected by corresponding control subsystems, such as electronic throttle control and/or fuel injection.

As such, the present invention provides a system and method for determining engine control parameters based on a requested engine torque which provides more robust control relative to prior art approaches, particularly in alternative control strategies and engine technologies including variable cam timing, lean burn, and direct injection applications.

While the best mode for carrying out the invention has been described in detail, those familiar with the art to which this invention relates will recognize various alternative designs and embodiments for practicing the invention as defined by the following claims.

What is claimed is:

1. A method for determining engine control parameters based on a requested engine brake torque, the method comprising:

determining a value representing engine losses based at least in part on the requested engine brake torque;

combining the value representing engine losses with the requested engine brake torque to determine a desired engine combustion torque;

modifying the desired engine combustion torque based on a desired value for at least one engine operating parameter;

determining at least one engine control parameter to control air mass delivered to at least one cylinder based on the modified desired engine combustion torque.

2. The method of claim 1 wherein the step of determining a value representing engine losses comprises determining a value representing engine pumping losses.

3. The method of claim 2 wherein determining a value representing engine pumping losses comprises determining a value based on desired engine load.

4. The method of claim 1 wherein the step of determining a value representing engine losses comprises determining a value representing engine frictional losses.

5. The method of claim 1 wherein the step of determining a value representing engine losses comprises determining a value representing engine pumping losses based on a desired engine load and engine frictional losses based on current engine speed.

6. The method of claim 1 wherein the step of modifying the desired engine combustion torque comprises modifying the desired engine combustion torque based on a desired air/fuel ratio.

7. The method of claim 6 wherein the step of modifying the desired engine combustion torque based on the air/fuel ratio comprises modifying the desired engine combustion torque based on a ratio of the desired air/fuel ratio to a stoichiometric air/fuel ratio.

8. The method of claim 1 wherein the step of modifying the desired engine combustion torque comprises modifying the desired engine combustion torque based on a desired ignition angle.

9. The method of claim 8 wherein the step of modifying the desired engine combustion torque based on the desired ignition angle comprises modifying the desired engine combustion torque based on a desired ignition angle relative to an ignition angle determined for maximum brake torque.

10. The method of claim 1 wherein the step of modifying the desired engine combustion torque comprises:
    modifying the desired engine combustion torque based on a single function of ignition angle and air/fuel ratio.

11. The method of claim 10 wherein the single function comprises a lookup table referenced by a first variable representing a difference between desired ignition angle and ignition angle for maximum brake torque, and a second variable representing a ratio of desired air/fuel ratio to a stoichiometric air/fuel ratio.

12. The method of claim 1 wherein the step of determining at least one engine control parameter comprises determining a desired air mass required to produce the modified desired engine combustion torque.

13. The method of claim 12 wherein the step of determining at least one engine control parameter further comprises converting the desired air mass to a desired airflow.

14. The method of claim 13 wherein the step of determining at least one engine control parameter further comprises determining a desired fuel mass based on the desired airflow.

15. The method of claim 13 wherein the step of determining at least one engine control parameter further comprises determining a desired fuel mass based on the desired airflow and a desired air/fuel ratio.

16. The method of claim 13 wherein the step of determining at least one engine control parameter further comprises determining a desired fuel mass based on an actual airflow and a desired air/fuel ratio.

17. A method for determining control parameters for an engine, the method comprising:
    determining a first engine torque;
    modifying the first engine torque based on estimated losses associated with a previously determined desired engine load to determine a second engine torque, the previously determined desired engine load being determined based in part on the first engine torque;
    modifying the second engine torque based on a desired ignition angle and air/fuel ratio to determine a third engine torque;
    determining a desired engine load based on the third engine torque; and
    converting the desired engine load to at least one engine control parameter.

18. The method of claim 17 wherein the step of converting the desired engine load comprises converting the desired engine load to a desired airflow.

19. The method of claim 17 wherein the step of converting the desired engine load comprises converting the desired engine load to a desired fuel mass.

20. The method of claim 19 wherein the step of converting the desired engine load to a desired fuel mass comprises converting the desired engine load to a desired fuel mass based on a desired airflow and a desired air/fuel ratio.

21. The method of claim 17 wherein the step of converting the desired engine load comprises converting the desired engine load to a desired fuel mass.

22. The method of claim 17 wherein the step of modifying the second engine torque comprises modifying the second engine torque as a function of a ratio of the desired air/fuel ratio to a stoichiometric air/fuel ratio and a difference between the desired ignition angle and an ignition angle for maximum brake torque.

23. A computer readable storage medium having stored data representing instructions executable by a computer to control an engine, the computer readable storage medium comprising:
    instructions for determining a value representing engine losses based at least in part on the requested engine brake torque;
    instructions for combining the value representing engine losses with the requested engine brake torque to determine a desired engine combustion torque;
    instructions for modifying the desired engine combustion torque based on a desired value for at least one engine operating parameter; and
    instructions for determining at least one engine control parameter to control air mass delivered to at least one cylinder based on the modified desired engine combustion torque.

24. The computer readable storage medium of claim 23 wherein the instructions for determining at least one engine control parameter comprise instructions for determining a desired engine load.

25. The computer readable storage medium of claim 24 wherein the instructions for determining a desired engine load comprise instructions for determining a desired airflow based on the desired engine load.

26. The computer readable storage medium of claim 25 further comprising instructions for determining a desired fuel mass based on the desired airflow.

* * * * *